United States Patent
Li et al.

(10) Patent No.: US 11,299,593 B2
(45) Date of Patent: Apr. 12, 2022

(54) FLUOROSILICONE RESIN AND PREPARATION METHOD THEREOF

(71) Applicant: SOOCHOW UNIVERSITY, Suzhou (CN)

(72) Inventors: Zhanxiong Li, Suzhou (CN); Yakun Zong, Suzhou (CN); Wulong Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/032,436

(22) Filed: Sep. 25, 2020

(65) Prior Publication Data

US 2021/0009761 A1  Jan. 14, 2021

Related U.S. Application Data

(63) Continuation of application No. PCT/CN2018/080358, filed on Mar. 23, 2018.

(51) Int. Cl.
| | |
|---|---|
| *C08G 77/24* | (2006.01) |
| *C08G 77/08* | (2006.01) |
| *C08G 77/20* | (2006.01) |
| *C09J 183/08* | (2006.01) |
| *C08G 77/00* | (2006.01) |
| *C07F 7/16* | (2006.01) |

(52) U.S. Cl.
CPC ............ *C08G 77/24* (2013.01); *C08G 77/08* (2013.01); *C08G 77/20* (2013.01); *C08G 77/80* (2013.01); *C09J 183/08* (2013.01); *C07F 7/16* (2013.01)

(58) Field of Classification Search
CPC .................................................. C08G 77/24
USPC ....................................................... 528/38, 42
See application file for complete search history.

(56) References Cited

U.S. PATENT DOCUMENTS

| | | | | |
|---|---|---|---|---|
| 3,423,445 A | * | 1/1969 | Holbrook ................. | C10M 3/00 556/454 |
| 2014/0232018 A1 | * | 8/2014 | Shigaki ................ | C09D 183/08 524/588 |
| 2017/0305938 A1 | * | 10/2017 | Fukushima ............. | C03C 17/30 |

FOREIGN PATENT DOCUMENTS

| | | |
|---|---|---|
| CN | 102924734 A | 2/2013 |
| CN | 108314796 A | 7/2018 |
| CN | 108373903 A | 8/2018 |
| CN | 108424746 A | 8/2018 |
| CN | 108484914 A | 9/2018 |
| KR | 20150039993 A | 4/2015 |

OTHER PUBLICATIONS

Machine translation for CN 104961897 (no date).*
Boutevin B. et al. "Synthese De Polysiloxanes Fluores Partie 1. Hydrosilylation D' Olefines Fluorees Allylques et Styreniques" Journal of Fluorine Chemistry, No. 31, Dec. 31, 1986, pp. 57-73.

* cited by examiner

*Primary Examiner* — Marc S Zimmer
(74) *Attorney, Agent, or Firm* — SZDC Law P.C.

(57) ABSTRACT

Provided is a fluorosilicone resin and a preparation method thereof. Using pentafluorostyrene as raw material, pentafluorophenethyldimethylchlorosilane is prepared by a hydrosilylation reaction. By means of a polycondensation reaction of the pentafluorophenethyldimethylchlorosilane, trimethylchlorosilane and tetraethyl orthosilicate, a pentafluorophenyl silicone resin is prepared. The preparation method adopts a two-step polycondensation process, which overcomes the disadvantages of a large difference in hydrolysis reactivity between pentafluorophenyldimethylchlorosilane and a copolymerized trialkyl-chlorosilane, and achieves a high yield. The obtained pentafluorophenyl silicone resin has the advantages of superior heat resistance, simple preparation process, low equipment requirements, high availability of raw material, and suitability for mass production. The heat-resistant fluorosilicone resin can be applied in a polymer material, such as a heat-resistant adhesive.

7 Claims, 2 Drawing Sheets

FLUOROSILICONE RESIN AND PREPARATION METHOD THEREOF

The present application is a Continuation Application of PCT/CN2018/080358, filed on Mar. 23, 2018.

TECHNICAL FIELD

The invention relates to a high temperature resistant fluorosilicone resin and a preparation method thereof, and the produced product can be used as a polymer modification or polymer additive, and belongs to the field of organosilicon synthesis and polymer auxiliaries.

BACKGROUND TECHNIQUE

Silicone is a thermoset plastic. One of its most outstanding properties is its excellent thermal oxidative stability and excellent electrical insulation properties. It maintains its good insulation properties over a wide temperature and frequency range. The silicone resin is usually a mixture of methyltrichlorosilane, dimethyldichlorosilane, phenyltrichlorosilane, diphenyldichlorosilane or methylphenyldichlorosilane in the presence of an organic solvent such as toluene, adding water at a lower temperature to obtain an acidic hydrolyzate. The initial product of hydrolysis is a mixture of cyclic, linear and crosslinked polymers, usually containing a substantial amount of hydroxyl groups. The hydrolyzate is washed with water to remove acid, neutral condensate, thermally oxidized in air or further polycondensed in the presence of a catalyst, and finally forms a highly crosslinked stereo network structure.

MQ resin is one of the most widely used silicone resins, which consists of a monofunctional silicon oxide unit (referred to as M unit). And a tetrafunctional siloxy unit (Q unit for short) consisting of a compact sphere with a two-layer structure, the molar mass of which is generally 1000-8000 g, the ratio of the M chain to the Q link in the molecular structure and M The structure determines the nature of the MQ resin. The most common M structure is methyl. The introduction of other groups in the MQ silicone resin can expand its use, but after introducing other structures into the MQ silicone resin, since these structures are reactive under certain conditions, it is disadvantageous to the heat resistance of the silicone resin; even if benzene is introduced The silicone resin of the base M structure also undergoes a mass loss of up to 8% after heating at 250° C. for 24 hours. This limits its use as a composite component at temperatures above 250° C.

SUMMARY OF INVENTION

Technical Problem

The present invention provides a novel silicone resin and a preparation method thereof, in view of the disadvantages of the existing silicone resin having insufficient heat resistance.

Solution to the Problem Technical Solution

In order to achieve the object of the invention described in the present invention, the technical solutions adopted are as follows:

A fluorosilicone resin, characterized in that the chemical structural formula of the fluorosilicone resin is:

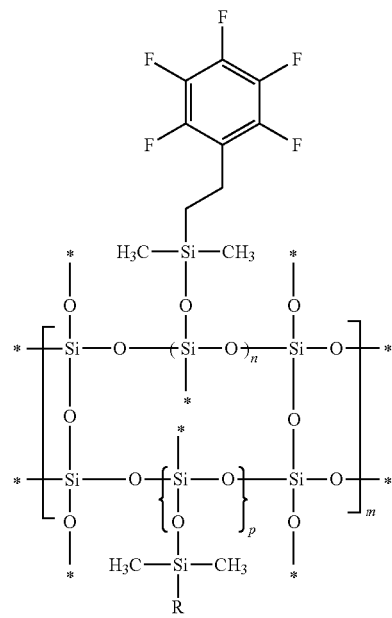

Wherein R=methyl, phenyl, vinyl or hydrogen;

m=2 to 20; n=1 to 5; p=1 to 8.

The method preparation of fluorosilicone resin includes the following steps:

(1) As raw materials with pentafluorostyrene and methyldichlorosilane, pentafluorophenethyldimethylchlorosilane is prepared under the catalysis of a noble metal salt;

(2) Adding a mixture of pentafluorophenethyldimethylchlorosilane and tetraethyl orthosilicate to a mixture of water, mineral acid and organic solvent for a polycondensation; then adding the mixture of trimethyl chlorosilane and tetraethyl orthosilicate, after the polycondensation, the fluorosilicone resin is prepared.

In the technical scheme above, the mass ratio of pentafluorostyrene, noble metal salt, and methyldichlorosilane is 1:(0.003 to 0.006):(0.5 to 2); In the mixture of pentafluorophenethyldimethylchlorosilane and tetraethyl orthosilicate, the mass ratio of pentafluorophenethyldimethylchlorosilane to tetraethyl orthosilicate is (1 to 6):(1 to 10); In the mixture of trimethyl chlorosilane and tetraethyl orthosilicate, the mass ratio of trimethyl chlorosilane to tetraethyl orthosilicate is (1 to 3):(1 to 10).

In the technical scheme above, Step (1) is: dissolving pentafluorostyrene into aromatic hydrocarbon solvent, adding catalyst of noble metal salt with protection of $N_2$; then dropping methyldichlorosilane at 50 to 140° C., and keep warm polycondensation for 1 to 10 hours, to prepare the pentafluorophenethyldimethylchlorosilane; Step (2) is: dispersing water and inorganic acid in the organic solvent, and then dropping the mixture of pentafluorophenethyldimethylchlorosilane and tetraethyl orthosilicate at 60 to 80° C., after completion of the dropwise polycondensation is carried out once for 0.5 to 1 hour; and then, dropping the mixture of trihydrocarbylmonochlorosilane and tetraethyl orthosilicate, after completion of the dropwise addition, the polycondensation is further carried out for 1 to 6 hours to prepare a fluorosilicone resin.

In the technical scheme above, the aromatic hydrocarbon solvent is one of toluene, xylene, Benzotrifluoride, 1,3-Bis(trifluoromethyl)benzene, the noble metal salt is chloroplatinic acid; the trihydrocarbylmonochlorosilane is one of trimethyl chlorosilane, dimethylhydrochlorosilane, dimethylhydrogen monochlorosilane, phenyldimethylmonochlorosilane; the inorganic acid is concentrated sulfuric acid or concentrated hydrochloric acid; the organic solvent is tetrahydrofuran.

In the technical scheme above, wherein the Step (1), the dropwise addition of the methyldichlorosilane for 0.5 to 5 hours; in the step (2), dropping the mixture of trihydrocarbylmonochlorosilane and tetraethyl orthosilicate for 0.5 to 1 hour.

In the technical scheme above, wherein the Step (1) after the reaction, the reaction liquid is removed the water and vacuum distillation to obtain pentafluorophenethyldimethylchlorosilane. Step (2) After the polycondensation, the reaction liquid is cooling, vacuum distillation, separation treatment, extraction, washing with distilled water, drying, filtration and distillation, the fluorosilicone resin is obtained at last.

The invention also discloses, a method preparation of pentafluorophenethyldimethylchlorosilane, comprising the steps of: dissolving pentafluorostyrene into aromatic hydrocarbon solvent, adding catalyst of noble metal salt with protection of $N_2$; then dropping methyldichlorosilane at 50 to 140° C., and keep warm polycondensation for 1 to 10 hours, to prepare the pentafluorophenethyldimethylchlorosilane.

In the technical scheme above, the aromatic hydrocarbon solvent is one of toluene, xylene, Benzotrifluoride, 1,3-Bis(trifluoromethyl)benzene, the noble metal salt is chloroplatinic acid; after the reaction, the reaction liquid is removed the water and vacuum distillation to obtain pentafluorophenethyldimethylchlorosilane.

The invention for the method preparation of fluorosilicone resin by polycondensation of pentafluorophenethyldimethylchlorosilane, tetraethyl orthosilicate and monochlorosilane monomer, the reaction formula is as follows:

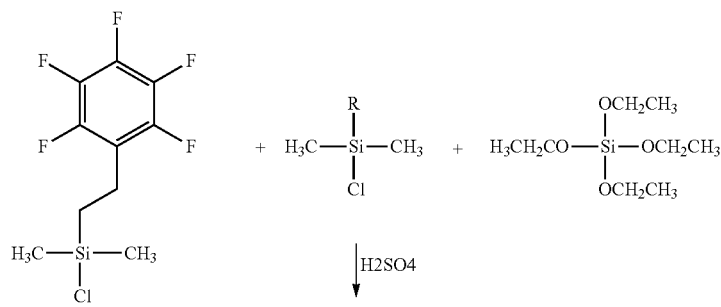

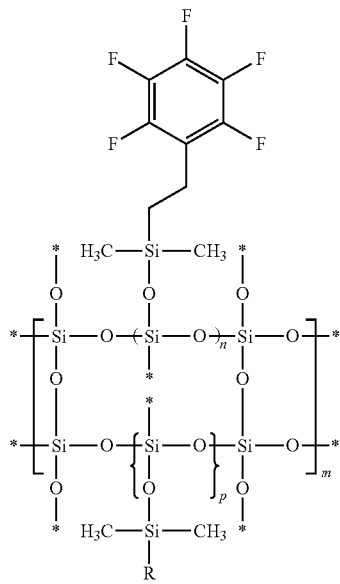

Wherein, R=methyl, phenyl, vinyl or hydrogen.

According to the technical scheme above, the fluorosilicone resin was synthesis by two steps, comprises hydrosilylation and polycondensation, and the specific steps can be as follows, (1) Hydrosilylation By mass, at 50° C. to 140° C., one part of pentafluorostyrene and 1 to 10 parts of aromatic hydrocarbon solvent were mixed, and added 0.003 to 0.006 parts of chloroplatinic acid with protection of $N_2$. At a certain period of time 0.5 to 2 parts of methyldichlorosilane were added dropwise, and the reaction was continued for 1 to 10 hours after the addition. After the reaction, removed the water of solvent and unreacted methyldichlorosilane, collected the fraction at 132° C. (3.75 kPa) by vacuum distillation, to obtain pentafluorophenethyldimethylchloroguanidine;

(2) Mixed silane: By mass, 1 to 6 parts of pentafluorophenethyldimethylchlorosilane and 1 to 10 parts of tetraethyl orthosilicate were mixed to get the mixture 1. By mass, 1 to 3 parts of trihydrocarbylmonochlorosilane and 1 to 10 parts of tetraethyl orthosilicate were mixed to get the mixture 2;

(3) The first polycondensation: By mass, 1 to 5 parts of water and 0.5 to 2 parts of inorganic acid are dispersed in 1 to 20 parts of tetrahydrofuran, and the temperature of the mixture is raised to 60 to 80° C. by heating, and the above mixture 1 is added dropwise. The dropping time is based on the temperature of the reaction liquid not exceeding 80° C., and the heat preservation reaction is 0.5 to 1 hour after the addition;

(4) Secondary polycondensation. After the end of one polycondensation, the mixture 2 is added dropwise, and the dropping time is 0.5 to 1 hour, after the addition, the reaction is kept for 1 to 6 hours;

(5) Post-treatment: After cooling the reaction liquid, the by-product ethanol and the solvent tetrahydrofuran were distilled off under reduced pressure, and the distillation temperature was 40 to 80° C., and the degree of vacuum was 0.5 to 20 mm Hg. Pour the remaining reaction solution into the separatory funnel and extract it with extractant for 3 to 5 times, using 1 to 5 portions of extractant each time. The extracts were combined and washed 3 to 5 times with distilled water, using 1 to 5 portions of distilled water each time. Add 0.2 to 1 part of desiccant and dry for 0.5 to 5 hours. The desiccant was removed by filtration, and distilled to obtain a white, loose solid product, fluorosilicone resin, the distillation temperature is 40 to 80° C. and the vacuum is 0.5 to 20 mmHg.

The invention used pentafluorostyrene and dimethylmonochlorosilane as raw materials to synthesize pentafluorophenethyldimethylchlorosilane by hydrosilylation reaction, and then pentafluorophenethyldimethylchlorosilane, trimethyl chlorosilane and ethyl orthosilicate are copolycondensed, and a fluorosilicone resin is prepared by a secondary polycondensation process. Compared with the existing resin, the pentafluorobenzene fluorosilicone resin of the invention has better thermal stability, high fluorocarbon bond energy and excellent heat resistance, and is heated at 550° C. and 400 atm for 24 hours without decomposition. It can be used as a fluorosilicone material with excellent heat resistance. It is suitable for use as a high temperature resistant additive in a variety of composite systems.

Advantageous Effects of the Invention

Beneficial Effect

The outstanding advantages of the present invention over the prior art are:

1. The fluorosilicone resin disclosed in the present invention is different from the prior art modified silicone resin in that the fluorine-containing silicone resin provided by the present invention provides a planar structure of phenyl conjugate and a large fluorocarbon bond energy, thereby providing A silicone material with excellent heat resistance.

2. In the preparation process of the fluorosilicone resin disclosed by the invention, the stepwise polycondensation process is creatively solved because the pentafluorophenyl group in the pentafluorophenethyldimethylchlorosilane is a rigid group, the steric hindrance is large, and the hydrolysis reactivity ratio is three. The difference in reactivity between the two monochlorosilanes caused by the difference in the hydrocarbyl-chlorosilane monomer avoids excessive cross-linking, thereby producing a high yield of fluorosilicone resin of 70% to 80%; It solves the problem that the existing fluorosilicone resin is realized by polycondensation, and there is extraction operation in the preparation, and the general yield is low.

3. The fluorine content of the fluorosilicone resin provided by the invention is adjustable, thus improving the design-ability of heat-resistant products; moreover, the raw materials used in the preparation of the fluorosilicone resin are all commercially available raw materials, which are widely sourced and cheap, which are conducive to the industrialization of the materials.

DRAWINGS

INVENTION EMBODIMENT

Embodiments of the Invention

Figure 1:
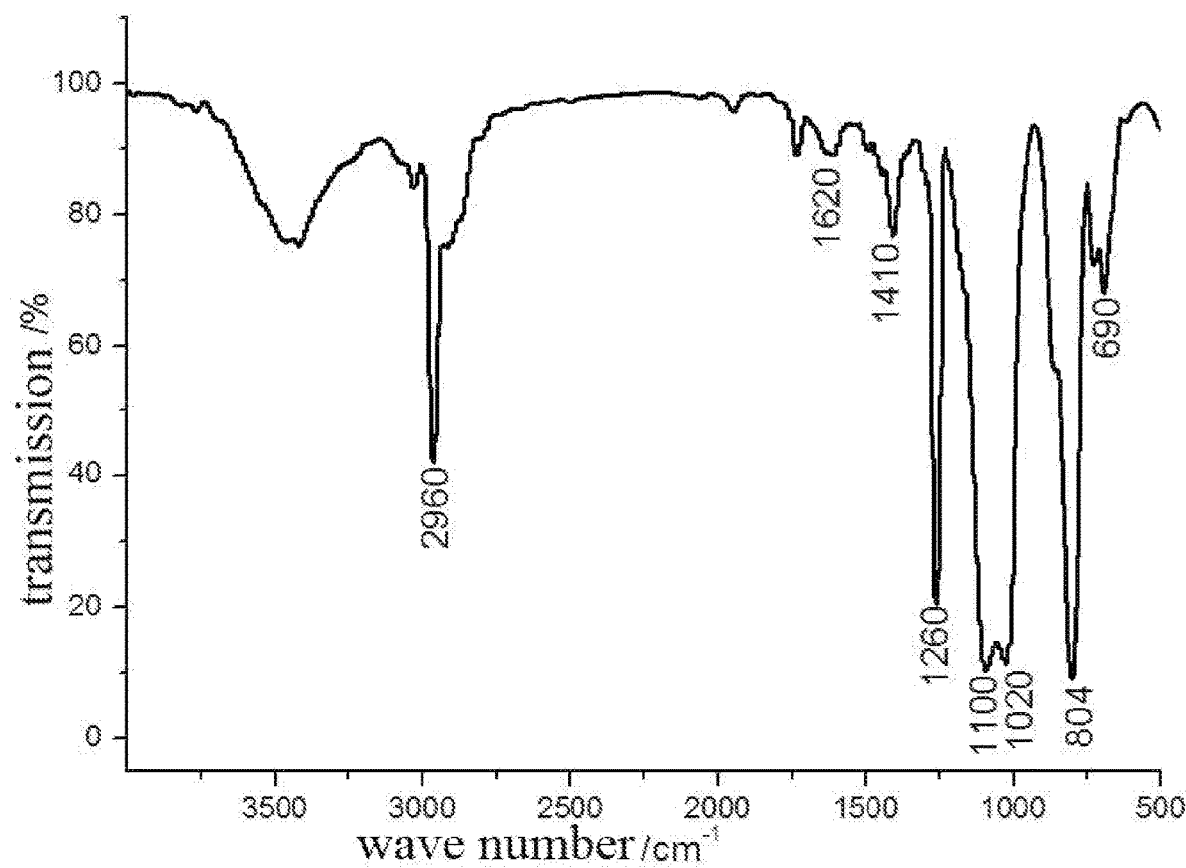
FIG. 1 is infrared spectrogram of fluorosilicone resin prepared in Example 1.

The technical solutions of the present invention are further described below with the drawings and embodiments.

EXAMPLE 1

(1) The Synthesis of pentafluorophenethyldimethylchlorosilane 500 mL three-necked flask equipped with a thermometer, a reflux condenser, and a constant pressure dropping funnel, heating by oil bath. 80 g of toluene and 65 g of pentafluorostyrene were successively added, stirred and dissolved, and 0.26 g of catalyst of chloroplatinic acid was added with protection of $N_2$. The heating was turned on, and after heating to 80° C., 51 g of methyldichlorosilane was added dropwise, and the dropping time was controlled for about 1 hour. After the addition was completed, the reaction was continued for 2 hours. After the reaction, removed the water of solvent and unreacted methyldichlorosilane, collected the fraction at 132° C. (3.75 kPa) by vacuum distillation, to obtain 95 g of pentafluorophenethyldimethylchloroguanidine; The purity of the product was determined by gas chromatography 96.6%, yield of 90.9%.

(2) Polycondensation into Fluorosilicone Resin

In 100 mL conical flask, 19.4 g of pentafluorophenethyl-dimethylchlorosilane and 33 g of tetraethyl orthosilicate were uniform mixed to get the mixture 1; In the other 100 mL conical flask, 5.5 g of trimethyl chlorosilane and 30 g of tetraethyl orthosilicate were uniform mixed to get the mixture 2. Two mixtures of silanes are spare.

500 mL three-necked flask equipped with a thermometer, a reflux condenser, and a constant pressure dropping funnel, heating by oil bath. 8 g of water and 5 g of concentrated sulfuric acid were carefully and slowly introduced into 50 g of tetrahydrofuran, and after heating to 70° C., dropped the mixture 1 above, and the dropping time was controlled for about 45 min. After the addition was completed, the reaction was continued for 0.5 to 1 hour. And then kept dropwise the mixture 2, the dropping time was controlled for about 1 h, after that, the second polycondensation was carried out for 6 hours.

When the reaction was stopped, the reaction liquid was vacuum distillation to remove ethanol and solvent tetrahydrofuran. The temperature of distillation was at 60° C., the degree of vacuum was 10 mmHg, and distillation was carried out until no liquid was distilled off. The toluene was extracted three times, and used 30 g of the toluene each time. The extracts were combined and washed 5 times with distilled water, and used 15 g of distilled water each time. After the washing, it was further dried by adding 6 g of anhydrous sodium sulfate for 5 hours. The desiccant was removed by filtration, and distilled to obtain 36.3 g of a white solid fluorophenyl silicone resin at the temperature of 80° C. and the degree of vacuum was 0.5 mmHg, yield of 72.6%.

The infrared spectrogram of fluorosilicone resin prepared above was shown in FIG. 1; It can be seen from the figure that the characteristic absorption peak of the benzene ring skeleton appears at 1620 $cm^{-1}$, and the 2960 $cm^{-1}$ is —$CH_3$, The C—H stretching vibration absorption peak, 1410 $cm^{-1}$ is the weak asymmetric deformation vibration of C—H in —$CH_3$, and 1260 $cm^{-1}$ is caused by the in-plane and out-of-plane bending vibration of the —$CH_3$ group of Si—$CH_3$ group. 1100 to 1020 $cm^{-1}$ is a Si—O—Si stretching vibration absorption peak, and 804 $cm^{-1}$ is a Si—C stretching vibration absorption peak.

Figure 2:
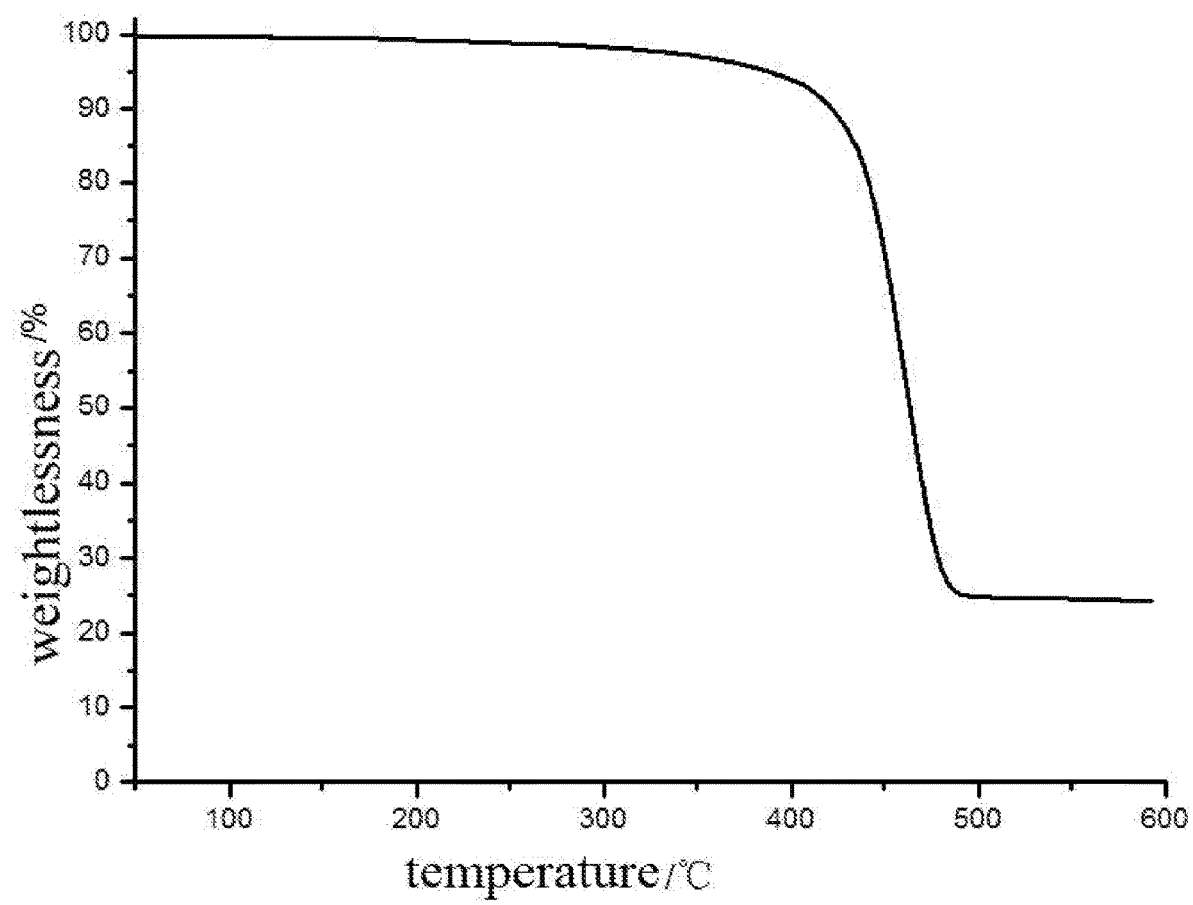
FIG. 2 is showing the test results of thermogravimetric of the fluorosilicone resin prepared in Example 1.

The test results of thermogravimetric of the fluorosilicone resin prepared above are shown in FIG. 2; the results show that the resin is heated to 394° C. with loss of 5% mass, and the carbon residue rate is 19.8%, which indicates that the fluorine-containing phenyl silicone resin has very excellent heat resistance.

The molecular structure of the product of the fluorosilicone resin was as follows:

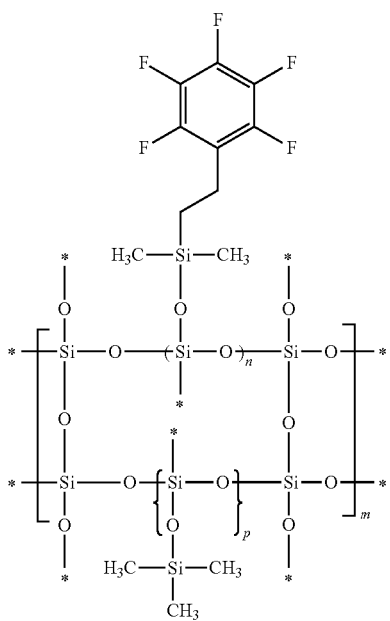

Wherein, m=2 to 10; n=1 to 3; p=1 to 3.

EXAMPLE 2

(1) The Synthesis Process of pentafluorophenethyldimethylchlorosilane was the Same with Example 1

(2) Polycondensation into Fluorosilicone Resin

In 250 mL conical flask, 19.4 g of pentafluorophenethyldimethylchlorosilane and 5.5 g of trimethyl chlorosilane and 63 g of tetraethyl orthosilicate were uniform mixed to get the mixed silane was spare.

500 mL three-necked flask equipped with a thermometer, a reflux condenser, and a constant pressure dropping funnel, heating by oil bath. 8 g of water and 5 g of concentrated sulfuric acid were carefully and slowly introduced into 50 g of tetrahydrofuran, and after heating to 70° C., dropped the mixed silane above, and the dropping time was controlled for about 42 min. After the addition was completed, the reaction was carried out for 6 hours.

When the reaction was stopped, the reaction liquid was vacuum distillation to remove ethanol and solvent tetrahydrofuran. The temperature of distillation was at 60° C., the degree of vacuum was 10 mm Hg, and distillation was carried out until no liquid was distilled off. The toluene was extracted three times, and used 30 g of the toluene each time. The extracts were combined and washed 5 times with distilled water, and used 15 g of distilled water each time. After the washing, it was further dried by adding 6 g of anhydrous sodium sulfate for 5 hours. The desiccant was removed by filtration, and distilled to obtain 41.6 g of a white solid fluorophenyl silicone resin at the temperature of 80° C. and the degree of vacuum was 0.5 mmHg, yield of 83.2%.

The test results of thermogravimetric of the fluorosilicone resin prepared above are shown in FIG. 2; the results show that the resin is heated to 394° C. with loss of 5% mass, and the carbon residue rate is 19.8%, which indicates that the fluorine-containing phenyl silicone resin has Very excellent heat resistance.

(3) Preparation of Silicone Adhesive 250 mL three-necked flask equipped with a thermometer, a reflux condenser, and a constant pressure dropping funnel, heating by oil bath.

16.8 g of 107 adhesive and 16 g of toluene were added in it, stirred and heated to 70° C., dropped 0.18 g of the DBTL, with $N_2$, added the solution which 0.13 g of dimethyldiethyloxysilane dissolved in 2.5 g of toluene and the dropping time was controlled for about 30 min, the reaction was carried out for 3 hours. Then added 20 g of the fluorosilicone resin above which dissolved in 25 g of toluene, raise the temperature to 110° C., reflux water separation reaction for 24 h. The product of polycondensation with 0.12 g of hexamethyldisilazane, 0.46 g of isopropanol, heated preservation and curing reaction for 5 h. When the reaction was stopped, the silicone pressure sensitive adhesive was got after cooling and discharging.

In the container, 200 g of toluene, 4 g of silicone pressure sensitive adhesive and 0.1 g of BPO were added, stir to make it mixed evenly, to get diluting glue on polyester film gummed by gluing machine, the thickness of the glue layer was controlled at 0.05 to 0.06 mm. Dried at 90° C. for 2 min after gummed, and cured at 150° C. for 5 min. According to GB/T 2792-1998: Test method for 180° peel strength of pressure sensitive adhesives, the peel strength of silicone pressure-sensitive adhesive was measured to be 30.5 N (2.5 cm). According to GB/T 17875-1999: Accelerated aging test method for pressure sensitive adhesives, after the adhesive is resistant to compression and oxidation at 250° C. for 72 h, the 180° peel strength is 28.5 N (2.5 cm). It shown that the heat resistance of adhesive is superior.

EXAMPLE 3

(1) The Synthesis of pentafluorophenethyldimethylchlorosilane 500 mL three-necked flask equipped with a thermometer, a reflux condenser, and a constant pressure dropping funnel, heating by oil bath. 40 g of trifluoromethylbenzene and 32 g of pentafluorostyrene were successively added, stirred and dissolved, and 0.1 g of catalyst of chloroplatinic acid was added with protection of $N_2$. The heating was turned on, and after heating to 80° C., 26 g of methyldichlorosilane was added dropwise, and the dropping time was controlled for about 1 hour. After the addition was completed, the reaction was continued for 1.5 hours. After the reaction, removed the water of solvent and unreacted methyldichlorosilane, collected the fraction at 132° C. (3.75 kPa) by vacuum distillation, to obtain 46 g of pentafluorophenethyldimethylchloroguanidine; The purity of the product was determined by gas chromatography 95.8%, yield of 84.6%.

(2) Polycondensation into pentafluorophenyl Vinyl Silicone Resin

In 100 mL conical flask, 19.5 g of pentafluorophenethyldimethylchlorosilane and 32 g of tetraethyl orthosilicate were uniform mixed to get the mixture 1; In the other 100 mL conical flask, 6 g of dimethylhydrogen monochlorosilane and 31 g of tetraethyl orthosilicate were uniform mixed to get the mixture 2. Two mixtures of silanes are spare.

500 mL three-necked flask equipped with a thermometer, a reflux condenser, and a constant pressure dropping funnel, heating by oil bath. 10 g of water and 6 g of concentrated sulfuric acid were carefully and slowly introduced into 60 g of tetrahydrofuran, and after heating to 72° C., dropped the mixture 1 above, and the dropping time was controlled for about 1 h. After the addition was completed, the polycondensation was continued for 0.5 hour. And then kept dropwise the mixture 2, the dropping time was controlled for about 1 h, after that, the second polycondensation was carried out kept warm.

When the reaction was stopped, the reaction liquid was vacuum distillation to remove ethanol and solvent tetrahydrofuran. The temperature of distillation was at 60° C., the degree of vacuum was 10 mm Hg, and distillation was carried out until no liquid was distilled off. The toluene was extracted three times, and used 30 g of the toluene each time. The extracts were combined and washed 5 times with distilled water, and used 15 g of distilled water each time. After the washing, it was further dried by adding 6 g of anhydrous sodium sulfate for 5 hours. The desiccant was removed by filtration, and distilled to obtain 34.1 g of a white solid fluorophenyl silicone resin at the temperature of 80° C. and the degree of vacuum was 0.5 mmHg, yield of 68.2%.

The molecular structure of the product was as follows:

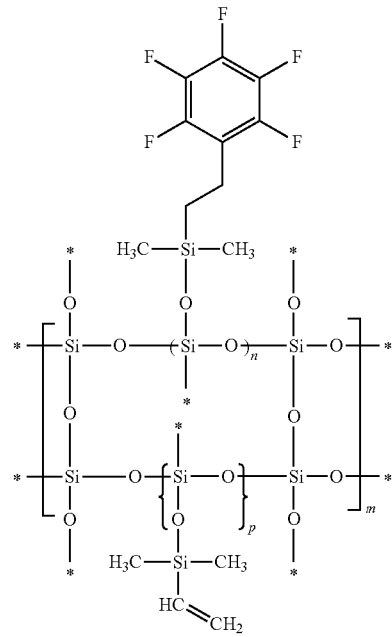

Wherein, m=2 to 8; n=2 to 4; p=2 to 4.

(3) Preparation of Silicone Adhesive 250 mL three-necked flask equipped with a thermometer, a reflux condenser, and a constant pressure dropping funnel, heating by oil bath.

17.2 g of 107 adhesive and 20 g of toluene were added in it, stirred and heated to 80° C., dropped 0.18 g of the DBTL, with $N_2$, added the solution which 0.15 g of dimethyldiethyloxysilane dissolved in 2.5 g of toluene and the dropping time was controlled for about 30 min, the reaction was carried out for 3 hours. Then added 28 g of the fluorosilicone resin above which dissolved in 25 g of toluene, raise the temperature to 110° C., reflux water separation reaction for 24 h. The product of polycondensation with 0.1 g of hexamethyldisilazane, 0.5 g of isopropanol, heated preservation and curing reaction for 5 h. When the reaction was stopped, the silicone pressure sensitive adhesive was got after cooling and discharging.

In the container, 200 g of toluene, 4 g of silicone pressure sensitive adhesive and 0.1 g of BPO were added, stir to make it mixed evenly, to get diluting glue on polyester film gummed by gluing machine, the thickness of the glue layer was controlled at 0.05 to 0.06 mm. Dried at 90° C. for 2 min after gummed, and cured at 150° C. for 5 min. According to GB/T 2792-1998: Test method for 180° peel strength of pressure sensitive adhesives, the peel strength of silicone pressure-sensitive adhesive was measured to be 29.6 N (2.5 cm). According to GB/T 17875-1999: Accelerated aging test method for pressure sensitive adhesives, after the adhesive is resistant to compression and oxidation at 250° C. for 72 h, the 180° peel strength is 28.1 N (2.5 cm).

EXAMPLE 4

(1) The Synthesis Process of pentafluorophenethyldimethylchlorosilane was the Same with Example 1

(2) Polycondensation into Fluorosilicone Resin

In 100 mL conical flask, 19.5 g of pentafluorophenethyl-dimethylchlorosilane and 32 g of tetraethyl orthosilicate were uniform mixed to get the mixture 1; In the other 100 mL conical flask, 10 g of phenyldimethylmonochlorosilane and 31.5 g of tetraethyl orthosilicate were uniform mixed to get the mixture 2. Two mixtures of silanes are spare.

500 mL three-necked flask equipped with a thermometer, a reflux condenser, and a constant pressure dropping funnel, heating by oil bath. 9 g of water and 6.5 g of concentrated sulfuric acid were carefully and slowly introduced into 55 g of tetrahydrofuran, and after heating to 75° C., dropped the mixture 1 above, and the dropping time was controlled for about 1 h. After the addition was completed, the reaction was continued for 0.5 hour. And then kept dropwise the mixture 2, the dropping time was controlled for about 1 h, after that, the second polycondensation was carried out kept warm for 5 h.

When the reaction was stopped, the reaction liquid was vacuum distillation to remove ethanol and solvent tetrahydrofuran. The temperature of distillation was at 60° C., the degree of vacuum was 10 mm Hg, and distillation was carried out until no liquid was distilled off. The toluene was extracted three times, and used 30 g of the toluene each time. The extracts were combined and washed 5 times with distilled water, and used 15 g of distilled water each time. After the washing, it was further dried by adding 6 g of anhydrous sodium sulfate for 5 hours. The desiccant was removed by filtration, and distilled to obtain 33.8 g of a white solid fluorophenyl silicone resin at the temperature of 80° C. and the degree of vacuum was 0.5 mmHg, yield of 67.6%.

The molecular structure of the product was as follows:

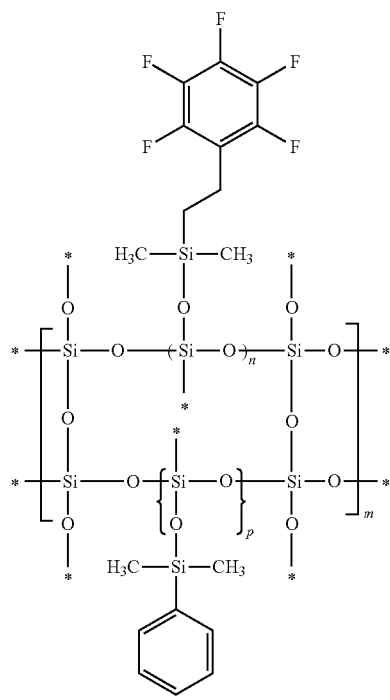

Wherein m=2 to 9; n=2 to 4; p=2 to 5.

(3) Preparation of Silicone Adhesive 250 mL three-necked flask equipped with a thermometer, a reflux condenser, and a constant pressure dropping funnel, heating by oil bath. 17.8 g of 107 adhesive and 25 g of toluene were added in it, stirred and heated to 80° C., dropped 0.16 g of the DBTL, with $N_2$, added the solution which 0.15 g of dimethyldiethyloxysilane dissolved in 2.5 g of toluene and the dropping time was controlled for about 30 min, the reaction was carried out for 3 hours. Then added 26 g of the fluorosilicone resin above which dissolved in 25 g of toluene, raise the temperature to 110° C., reflux water separation reaction for 24 h. The product of polycondensation with 0.1 g of hexamethyldisilazane, 0.5 g of isopropanol, heated preservation and curing reaction for 5 h. When the reaction was stopped, the silicone pressure sensitive adhesive was got after cooling and discharging.

In the container, 200 g of toluene, 4 g of silicone pressure sensitive adhesive and 0.1 g of BPO were added, stir to make it mixed evenly, to get diluting glue on polyester film gummed by gluing machine, the thickness of the glue layer was controlled at 0.05 to 0.06 mm. Dried at 90° C. for 2 min after gummed, and cured at 150° C. for 5 min. According to GB/T 2792-1998: Test method for 180° peel strength of pressure sensitive adhesives, the peel strength of silicone pressure-sensitive adhesive was measured to be 29.8 N (2.5 cm). According to GB/T 17875-1999: Accelerated aging test method for pressure sensitive adhesives, after the adhesive is resistant to compression and oxidation at 250° C. for 72 h, the 180° peel strength is 28.3 N (2.5 cm).

EXAMPLE 5

(1) The Synthesis Process of pentafluorophenethyldimethylchlorosilane was the Same with Example 1

(2) Polycondensation into pentafluorophenyl Vinyl Silicone Resin

In 100 mL conical flask, 20 g of pentafluorophenethyldimethylchlorosilane and 30 g of tetraethyl orthosilicate were uniform mixed to get the mixture 1; In the other 100 mL conical flask, 3 g of dimethylhydrogen monochlorosilane and 30 g of tetraethyl orthosilicate were uniform mixed to get the mixture 2. Two mixtures of silanes are spare.

500 mL three-necked flask equipped with a thermometer, a reflux condenser, and a constant pressure dropping funnel, heating by oil bath. 8 g of water and 6 g of concentrated sulfuric acid were carefully and slowly introduced into 50 g of tetrahydrofuran, and after heating to 71° C., dropped the mixture 1 above, and the dropping time was controlled for about 1 h. After the addition was completed, the polycondensation was continued for 0.5 hour. And then kept dropwise the mixture 2, the dropping time was controlled for about 1 h, after that, the second polycondensation was carried out kept warm for 5 h.

When the reaction was stopped, the reaction liquid was vacuum distillation to remove ethanol and solvent tetrahydrofuran. The temperature of distillation was at 60° C., the degree of vacuum was 10 mm Hg, and distillation was carried out until no liquid was distilled off. The toluene was extracted three times, and used 25 g of the toluene each time. The extracts were combined and washed 5 times with distilled water, and used 12 g of distilled water each time. After the washing, it was further dried by adding 5 g of anhydrous sodium sulfate for 5 hours. The desiccant was removed by filtration, and distilled to obtain 35.6 g of a white solid fluorophenyl silicone resin at the temperature of 80° C. and the degree of vacuum was 0.5 mmHg, yield of 71.2%.

The molecular structure of the product was as follows:

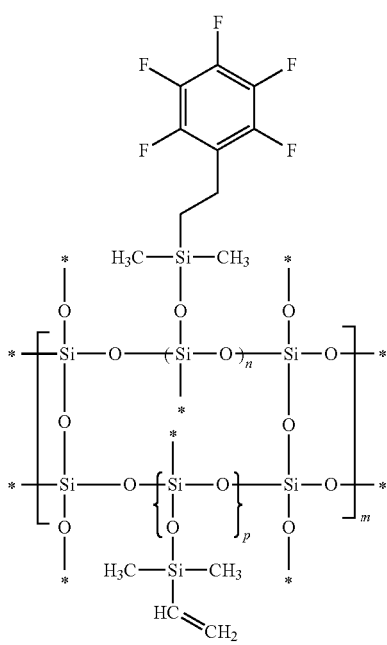

Wherein, m=2 to 12; n=2 to 5; p=1 to 4.

(3) Preparation of Silicone Adhesive 250 mL three-necked flask equipped with a thermometer, a reflux condenser, and a constant pressure dropping funnel, heating by oil bath. 18.1 g of 107 adhesive and 25 g of toluene were added in it, stirred and heated to 80° C., dropped 0.2 g of the DBTL, with $N_2$, added the solution which 0.15 g of dimethyldiethyloxysilane dissolved in 2.8 g of toluene and the dropping time was controlled for about 30 min, the reaction was carried out for 3 hours. Then added 27 g of the fluorosilicone resin above which dissolved in 25 g of toluene, raise the temperature to 110° C., reflux water separation reaction for 24 h. The product of polycondensation with 0.1 g of hexamethyldisilazane, 0.5 g of isopropanol, heated preservation and curing reaction for 5 h. When the reaction was stopped, the silicone pressure sensitive adhesive was got after cooling and discharging.

In the container, 200 g of toluene, 4 g of silicone pressure sensitive adhesive and 0.1 g of BPO were added, stir to make it mixed evenly, to get diluting glue on polyester film gummed by gluing machine, the thickness of the glue layer was controlled at 0.05 to 0.06 mm. Dried at 90° C. for 2 min after gummed, and cured at 150° C. for 5 min. According to GB/T 2792-1998: Test method for 180° peel strength of pressure sensitive adhesives, the peel strength of silicone pressure-sensitive adhesive was measured to be 30.3 N (2.5 cm). According to GB/T 17875-1999: Accelerated aging test method for pressure sensitive adhesives, after the adhesive is resistant to compression and oxidation at 250° C. for 72 h, the 180° peel strength is 29.1 N (2.5 cm).

The invention claimed is:

1. A fluorosilicone resin having the following chemical structural formula:

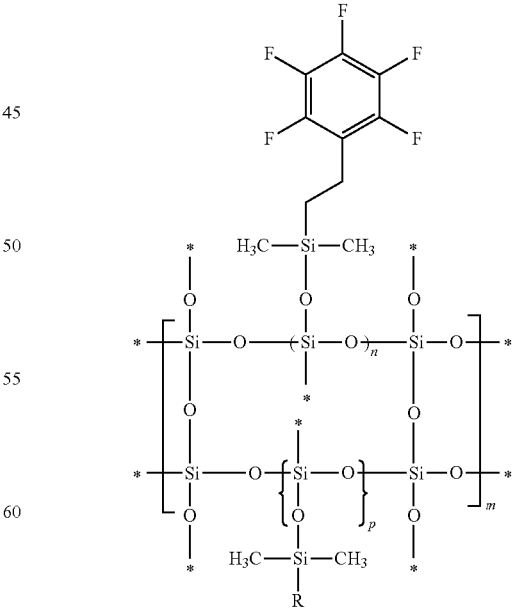

wherein R=methyl, phenyl, vinyl or hydrogen; m=2 to 20; n=1 to 5; and p=1 to 8.

2. A method of preparing the fluorosilicone resin according to claim 1, comprising the following steps:
(1) reacting a pentafluorostyrene with a dimethylchlorosilane in the presence of a noble metal salt as a catalyst to prepare a pentafluorophenethyldimethylchlorosilane;
(2) reacting the pentafluorophenethyldimethylchlorosilane and a tetraethyl orthosilicate in a mixture of water, an inorganic acid and an organic solvent to form a polycondensation product, and reacting the polycondensation product with a mixture of a trimethyl chlorosilane and a tetraethyl orthosilicate to form the fluorosilicone resin.

3. The method according to claim 2, wherein a mass ratio of the pentafluorostyrene, the noble metal salt, and the dimethylchlorosilane is 1:(0.003 to 0.006):(0.5 to 2); a mass ratio of the pentafluorophenethyldimethylchlorosilane to the tetraethyl orthosilicate is (1 to 6):(1 to 10); a mass ratio of trimethyl chlorosilane to tetraethyl orthosilicate is (1 to 3):(1 to 10).

4. The method according to claim 2, further comprising:
step (1): dissolving the pentafluorostyrene into an aromatic hydrocarbon solvent, adding the noble metal salt with protection of $N_2$; adding the dimethylchlorosilane dropwise at 50 to 140° C., and conducting a reaction at 50 to 140° C. for 1 to 10 hours, to form the pentafluorophenethyldimethylchlorosilane;
step (2): dispersing water and the inorganic acid in the organic solvent; adding the mixture of the pentafluorophenethyldimethylchlorosilane and the tetraethyl orthosilicated dropwise to the organic solvent at 60 to 80° C.; carrying out a first polycondensation for 0.5 to 1 hour to form the polycondensation product; adding the mixture of the trihydrocarbylmonochlorosilane and the tetraethyl orthosilicate to the polycondensation product; carrying out a second polycondensation for 1 to 6 hours to form the fluorosilicone resin.

5. The method according to claim 4, wherein the aromatic hydrocarbon solvent is selected from the group consisting of toluene, xylene, benzotrifluoride, 1,3-bis(trifluoro-methyl) benzene, the noble metal salt is chloroplatinic acid; the trihydrocarbylmonochlorosilane is selected from the group consisting of trimethyl chlorosilane, dimethylhydrochlorosilane, dimethylhydrogen monochlorosilane, phenyldimethylmonochlorosilane; the inorganic acid is concentrated sulfuric acid or concentrated hydrochloric acid; and the organic solvent is tetrahydrofuran.

6. The method according to claim 4, wherein, in the step (1), the dimethylchlorosilane is added dropwise over a period of 0.5 to 5 hours; in the step (2), the mixture of the trihydrocarbylmonochlorosilane and the tetraethyl orthosilicate is added over a period of 0.5 to 1 hour.

7. The method according to claim 4, further comprising:
in the step (1), removing the aromatic hydrocarbon solvent under vacuum to obtain the pentafluorophenethyldimethylchlorosilane after completing the reaction; and
in step (2), after the second polycondensation, cooling, distilling under vacuum, separating, extracting, washing with distilled water, drying, filtering, and distilling to form the fluorosilicone resin.

* * * * *